United States Patent [19]
Udd et al.

[11] Patent Number: 5,446,533
[45] Date of Patent: Aug. 29, 1995

[54] FIBER OPTIC MEASURING APPARATUS AND METHOD

[75] Inventors: Eric Udd, Huntington Beach; John P. Theriault, Fountain Valley, both of Calif.

[73] Assignee: McDonnell Douglas Corporation, Huntington Beach, Calif.

[21] Appl. No.: 179,639

[22] Filed: Apr. 8, 1988

[51] Int. Cl.[6] .................. G01N 21/00; G01C 3/08; G02B 6/00
[52] U.S. Cl. .................. 356/73.1; 356/5.01; 356/350; 385/12
[58] Field of Search .......... 356/73.1, 350, 5; 385/12

[56] References Cited

U.S. PATENT DOCUMENTS

| | | | |
|---|---|---|---|
| 4,176,954 | 12/1979 | Bouillie et al. | 356/73.1 |
| 4,408,882 | 10/1983 | Sheem | 356/350 |
| 4,471,659 | 9/1984 | Udd et al. | 73/655 |
| 4,588,296 | 5/1986 | Cahill et al. | 356/350 |
| 4,671,658 | 6/1987 | Shaw et al. | 356/350 |
| 4,759,629 | 7/1988 | Everest et al. | 356/350 |

FOREIGN PATENT DOCUMENTS 2058397 4/1981 United Kingdom ............ 356/350

OTHER PUBLICATIONS

Lin et al "Measuring Dispersion in Single-Mode Fibers in The 1.1-1.3MM Spectral Region-A Pulse Synchronization Technique" IEEE J of Quantum Electronics, vol. QE-16, #1 Jan. 1980 pp. 33-36.
"Fiber-optic Sensor Systems for Aerospace Application," E. Udd, et al., Proceedings of SPIE, V. 838, p. 162, 1987.
*Interaction between Light and Sound*, R. J. Adler, IEEE Spectrum (May 1967) pp. 42-54.

Primary Examiner—Stephen C. Buczinski
Attorney, Agent, or Firm—Donald E. Stout; John P. Scholl; Roger C. Turner

[57] ABSTRACT

A method and apparatus for a fiber optic measuring system is disclosed which works on the speed of propagation principle. The device can be utilized to determine the position of a disturbance or electronic source along the length of an optical path.

24 Claims, 5 Drawing Sheets

FIBER OPTIC MEASURING APPARATUS AND METHOD

BACKGROUND OF THE INVENTION

The method and device embodying the present invention relates to optic measuring systems, and in particular those systems using fiber optic Sagnac interferometric techniques.

Optic measurement techniques are increasingly in demand due to the advantages such as light weight and low maintenance costs. Once an optical path is established, as by means of a fiber optic cable, it is desirable to have the ability to pinpoint any disturbances occurring along the path of optical light propagation. Time domain reflectometry has been used to make position measurements in certain limited situations, but it is cumbersome and unsuitable in many instances. It is especially cumbersome and disadvantageous for use in specific applications involving the Sagnac interferometer.

SUMMARY OF THE INVENTION

In Sagnac interferometric devices it is critical to know the lengths of the optical paths. Before being placed into service, the devices must be calibrated. The length of a fiber optic sensing loop in a fiber optic sensor must be known with sufficient certainty to permit the most accurate calibration.

In a typical Sagnac sensor, such as that described in a patent application entitled "Fiber Optic Sensor", on behalf of Eric Udd, et al., Ser. No. 917,390, which issued on Nov. 29, 1988 as U.S. Pat. No. 4,787,741, a phase modulator is an important part of the device. A phase modulator is normally placed at one end of the sensing loop. The exact location of the phase modulator is important in order to calibrate the system to accurately detect environmental disturbances. The environmental disturbances typically act in a nonsevere manner upon the fiber optic sensing coil in the form of temperature, pressure and strain. To detect these environmental disturbances and the slight affect they have on the sensing fiber, the system dimensions must be ascertained to the highest degree of accuracy.

The fiber optic measuring system of the present invention may be used to determine the position of this type of phase modulator within the Sagnac interferometer to a high degree of accuracy. In particular, it may be used to determine the overall length of the entire fiber optic coil, inclusive of the sensing and detection elements. It can also determine the distance from the phase modulator to the central beamsplitter as well as the distance from the phase modulator to its symmetry point on the fiber optic coil.

In addition, the fiber optic measuring system of the present invention can measure the key parameters of an unknown single mode fiber coil. The device herein is ideally suited to perform length and dispersion measurements under fixed or varying environmental conditions. The device herein is a convenient means for defining the key performance parameters of the fiber optic coil and phase modulator in the Sagnac interferometer configuration. Also, the device can be used as a new class of fiber optic sensors by using its optical pathlength measuring capability to determine the magnitude of the environmental effect which induced the change in pathlength.

BRIEF DESCRIPTION OF THE DRAWINGS

The foregoing summary of the invention and other advantages of the invention will be described in more detail below taken in conjunction with the accompanying drawings of which.

DESCRIPTION OF THE PREFERRED EMBODIMENT

Figure 1:
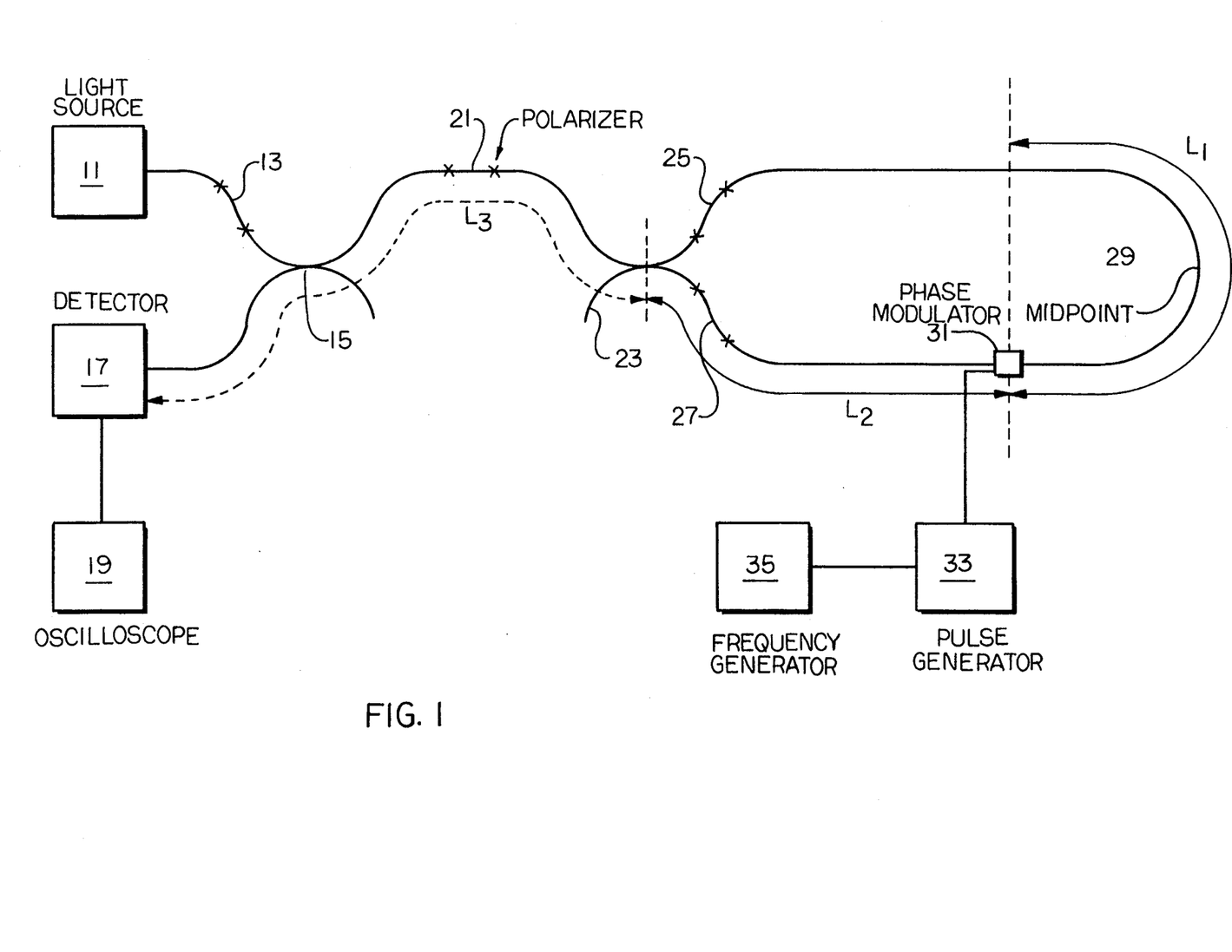
FIG. 1 is a schematic of a generalized Sagnac fiber optic system which will illustrate the workings of the device of the present invention.

Referring to FIG. 1, a schematic of a generalized Sagnac fiber optic system of the present invention is shown. Light source 11 is fiber optically connected to a first intensity maintenance element 13. First intensity maintenance element 13 is fiber optically connected to a first beam splitter 15. First beam splitter 15 is also fiber optically connected to a detector 17. Detector 17 is electrically connected to an oscilloscope 19.

First beam splitter 15 is also fiber optically connected to a polarizer 21. Polarizer 21 is fiber optically connected to a second beam splitter 23. Opposite the fiber optic connection to polarizer 21, second beam splitter 23 has one fiber optic connection to a second intensity maintenance element 25, and another fiber optic connection to a third intensity maintenance element 27. Intensity maintenance elements 25 and 27 are fiber optically connected by an elongate optical fiber 29 arranged generally in the shape of a loop.

A phase modulator 31 is situated along the elongate optical fiber 29. A distance L1 is illustrated, and is the product of twice the distance in the counterclockwise direction from phase modulator 31 to the midpoint of the loop formed by elongate optical fiber 29. If the loop formed by elongate optical fiber 29 is considered to have a top half and a bottom half, L1 represents the distance required to travel from pulse generator 33, located on one half of the loop to the point where its mirror image would be located on the other half of the loop. Phase modulator 31 is electrically connected to a pulse generator 33. Pulse generator 33 is electrically connected to a frequency generator 35.

Light source 11, such as a light emitting diode (LED) or superradiant diode is used to supply a steady reliable source of light to first intensity maintenance element 13. First intensity maintenance element 13 is used to scramble any residual polarization in the light beam emanating from light source 11. The purpose of the intensity maintenance units is to allow the usage of single mode optical fiber without signal fading alternatively polarization preserving fiber may be used throughout the device. After passing through by intensity maintenance element 13, the light beam from light source 11 enters beam splitter 15. Beam splitter 15 is of the input/output type. A light beam propagating away from light source 11 will pass through beam splitter 15 with almost no light from the light source 11 reflecting back onto detector 17. Detector 17 will be enabled to receive light propagating from polarizer 21 toward beam splitter 15.

The polarizer 21 is for the purpose of insuring that reciprocity conditions are met for light travelling in both directions. After light from light source 11 propagates through polarizer 21, it is split into counterpropagating beams by second beam splitter 23. The light beam is split into a clockwise propagating beam and a counterclockwise propagating beam. The clockwise propagating beam propagates through second intensity maintenance element 25, optical fiber 29, phase modulator 31, and third intensity maintenance element 27. The counterclockwise propagating beam propagates through third intensity maintenance element 27, phase modulator 31, optical fiber 29, and second intensity maintenance element 25. Phase modulator 31 should be considered as occupying various points along the length of optical fiber 29. The distances L1 and L2 represent distances which can be varied in terms of their absolute magnitudes. The principles by which the method and device of the present invention operates apply to all magnitudes. The actual positioning of phase modulator in the loop formed by optical fiber 29 is arbitrary.

Frequency generator 35 triggers pulse generator 33. Pulse generator 33 drives phase modulator 31 to impress a phase change over a short time interval on the counterpropagating light beams within optical fiber 29. The two counterpropagating light beams recombine on second beam splitter 23. The recombined light beam carries an amplitude modulated signal resulting from the phase difference experienced by the clockwise and counterclockwise counterpropagating beams which formed the recombined light beam. The recombined light beam propagates back to detector 17 through polarizer 21 and first beam splitter 15. Oscilloscope 19 displays the electronic activity within detector 17 by means of an electrical connection therewith. The oscilloscope 19 may have a sweep triggerable by frequency generator 35 to synchronize and therefore enable the best view of the time varying changes occurring within detector 19.

The theory of operation of the method and apparatus of the present invention is best illustrated by considering the case of a single pulse impressed upon the counterpropagating beams by phase modulator 31. When the pulse is produced, it is impressed upon both counterpropagating light beams simultaneously. Phase modulator 31 is offset from the exact center of the fiber coil by one half of the distance L1, or (L1)/2. If the two counterpropagating light beams are out of phase, phase pulse impressed by the phase modulator 31 is converted to an amplitude pulse when the clockwise and counterclockwise light beams recombine upon second beam splitter 23. The pulse is transmitted to detector 17 and is readily observable on oscilloscope 19.

Figure 2:
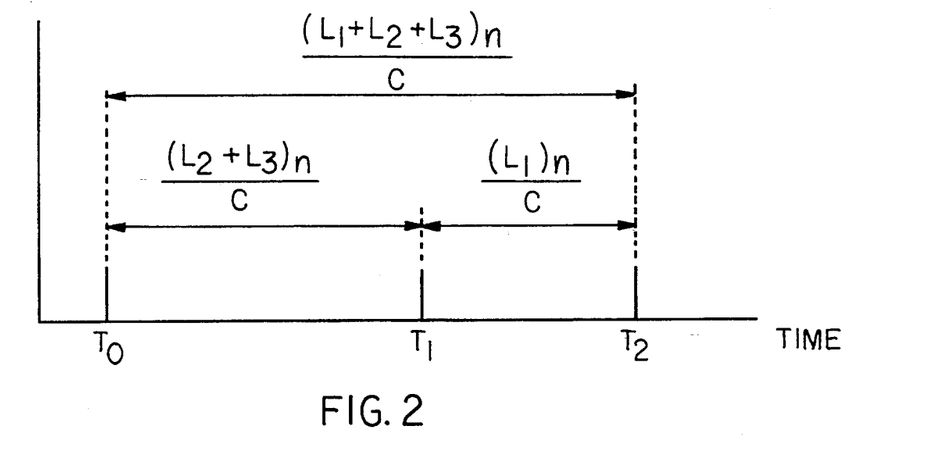
FIG. 2 is a graphical illustration of the timing sequence of the phase pulses used in the present invention with dimensions referable to those illustrated in FIG. 1.

Referring to FIG. 2, a graphical illustration of the timing sequence of the phase pulses emitted by phase modulator 31 is shown. The occurrence of the events shown in FIG. 2 are referenced to events occurring at detector 17 where the separation in optical path between the central beam splitter 23 and detector 17 is neglected. For exactness the optical path L3 between the central beam splitter 23 and detector 17 should be added to $L_1$ and $L_2$ to represent the total optical pathlength difference from the phase modulator 31 to the detector 17. At a time equal to $T_0$, phase modulator 31 emits a pulse. Referring to FIG. 1, the pulse combines with both the clockwise and counterclockwise propagating beams of light. The clockwise propagating beam of light with the phase modulated pulse impressed upon it must only travel a distance $L_2$ before reaching second beam splitter 23. At second beamsplitter 23, the phase modulated clockwise beam of light combines with the non phase modulated counterclockwise propagating beam of light, both to be interferometrically combined then transmitted to detector 17. Sufficient time has not yet elapsed for the portion of the counterclockwise beam of light which has been phase modulated to reach second beam splitter 23. This is why the phase modulated clockwise beam of light will initially combine with a counterclockwise beam of light which has not yet been phase modulated.

The combined clockwise and counterclockwise beam arrives at the detector 17 with a first pulse due to the modulation of the clockwise beam of light within optical fiber 29. Referring to FIG. 2, this event is represented on the graph as a unit pulse occurring at time $T_1$. Referring back to FIG. 1, when the clockwise phase impressed pulse was travelling toward and combining upon second beam splitter 23, the counterclockwise phase impressed pulse was travelling past the midpoint of and around optical fiber 29. The unit pulse due to the phase impressed counterclockwise light beam does not reach detector 17 until some time after the unit pulse due to the phase impressed clockwise light beam. Referring to FIG. 2, this is represented on the graph as a unit pulse occurring at time $T_2$.

As shown in FIG. 2, the time before the first pulse arrives at the detector is equal to $(L_2+L_3)n/c$, where $L_2$ is the distance from phase modulator 31 to second beam splitter 23 as was shown in FIG. 1, $L_3$ is the distance from the second beam splitter 23 to the detector 17, n is the refractive index of the medium in which the counterpropagating light beams travel, and c is the speed of light. Similarly the time of arrival of the second pulse at the detector is equal to $(L_1+L_2+L_3)n/c$, where $L_1$ is twice the distance from phase modulator 31 to the midpoint of optical fiber 29 as was shown in FIG. 1, $L_3$ is the distance from the second beam splitter 23 to the detector 17, n is the refractive index of the medium in which the counterpropagating light beams travel, and c is the speed of light. Note in FIG. 2 that the quantities of time $(L_2+L_3)n/c$ and $(L_1+L_2+L_3)n/c$ do not overlap unless $L_1$ equals zero representing the special case of the phase modulator 31 located at the midpoint of the fiber loop 29, and are the distances between each of the time quantities $T_0$, $T_1$, and $T_2$.

Figure 3:
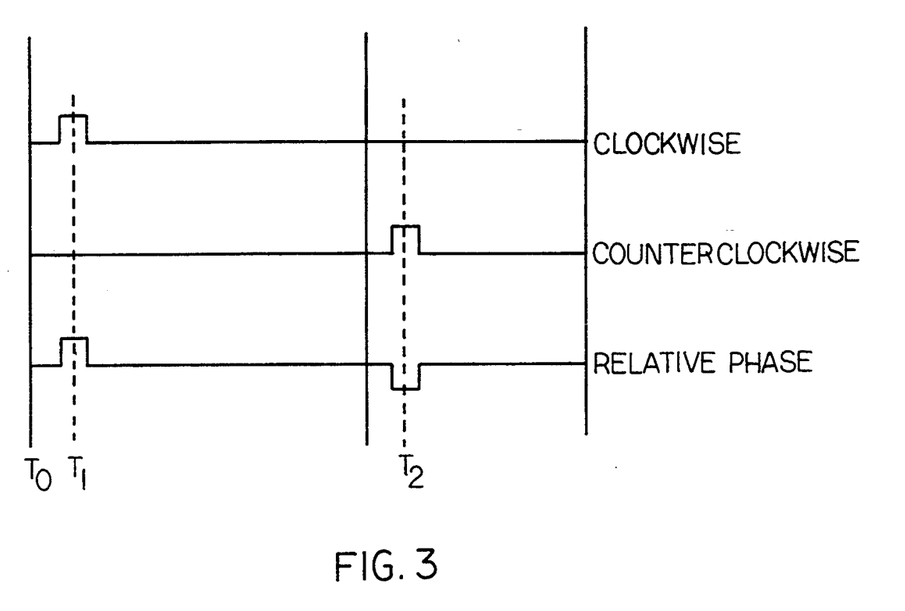
FIG. 3 is a timing and relative phase graph illustrating the time of arrival of the clockwise and counter-clockwise phase pulses, and the resulting relative phase separation between them, as utilized in the Sagnac fiber optic system of FIG. 1.

FIG. 3 is a timing and relative phase graph illustrating the time of arrival of the clockwise and counterclockwise phase pulses, and the resulting relative phase separation between them. $T_0$ is the time of the initialization of the pulse, $T_1$ is the time of arrival of the clockwise pulse and $T_2$ is the time of arrival of the counterclockwise pulse. The relative magnitudes of the times shown in FIG. 3 illustrate a typical case wherein the phase modulator 31 of FIG. 1 is offset from the center of the fiber loop 29.

Measuring the time difference between the initiation and arrival of the clockwise and counterclockwise pulses is one way to utilize the method and device of the present invention. A more accurate means to measure the distance $L_1$ of FIG. 1 is to use a pulse train at a variable repetition rate. The repetition rate is adjusted until the successive pulses null each other out. This nulling out occurs when the frequency of pulsation is such that the n+1th clockwise pulse arrives at second beam splitter 23 at the same time as the nth counterclockwise pulse for the case where the phase modulator 31 is closer to the central beam splitter 23 along the counterclockwise path of the optical fiber 29. The situation is reversed if the phase modulator 31 is closer to the central beam splitter 23 along the clockwise path of the optical fiber 29. If both the clockwise and counterclockwise pulses combine upon beam splitter 31 simultaneously, the phases will cancel each other to form the nulled out condition. As the clockwise and counterclockwise beams proceed to detector 17, this nulling effect is transmitted with them. Therefore detector 17 can detect the nulling and facilitate its display on oscilloscope 19.

For a fiber optic Sagnac system as shown in FIG. 1, the frequency necessary for the n+1 clockwise pulse to combine with and cancel the nth counterclockwise pulse is referred to as the characteristic frequency of the system. This frequency will be a function of $L_1$ and $L_2$, and thus measure the placement of the phase modulator 31 along optical fiber 29 of FIG. 1.

Figure 4:
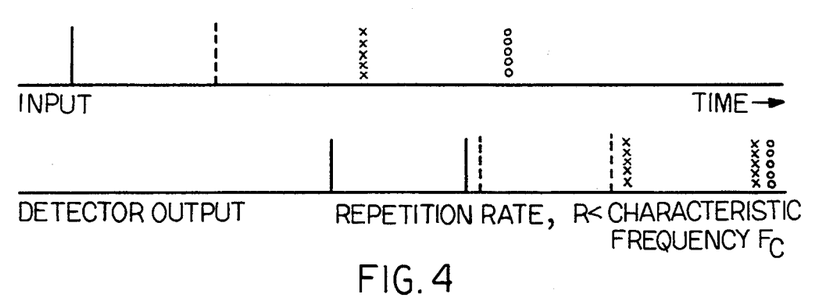
FIG. 4 is a graphical illustration of the utilization of the present invention in the Sagnac fiber optic system of FIG. 1, operating in the repetitive pulse train mode at a frequency of repetition less than the characteristic frequency.

A repetition frequency for the pulsing of phase modulator 31 which is less than the characteristic frequency will result in the reception of both the clockwise and the counterclockwise pulse resulting from a single pulse triggering at detector 17 before receipt of the next one of the next pair of pulses from the next triggering. This is illustrated in FIG. 4. The first line in FIG. 4 illustrates a rate of repetition of the firing of phase modulator 31 which is less than the characteristic frequency for the particular Sagnac fiber optic configuration. The second line illustrates the pairs of pulses received at detector 17 which relate to a single phase modulator 31 pulse. This results in a non continuous, or spaced, condition with respect to each set of received pulses. Both of the pulses from a single phase modulator 31 activation are received before any one of the next pair are received.

Figure 5:
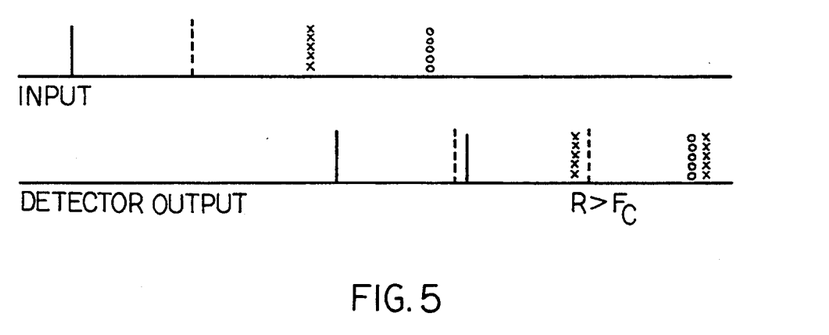
FIG. 5 is a graphical illustration of the utilization of the present invention in the Sagnac fiber optic system of FIG. 1, operating in the repetitive pulse train mode at a frequency of repetition greater than the characteristic frequency.

A repetition frequency for the pulsing of phase modulator 31 which is greater than the characteristic frequency will result in the reception of the clockwise pulse of the next pair of pulses before the counterclockwise pulse of the last pair of pulses is received at detector 17. This is illustrated in FIG. 5. The first line in FIG. 5 illustrates a rate of repetition of the firing of phase modulator 31 which is greater than the characteristic frequency for the particular Sagnac fiber optic configuration. The second line illustrates the pairs of pulses received at detector 17 which relate to a single phase modulator 31 pulse. A repetition frequency for the pulsing of phase modulator 31 which is greater than the characteristic frequency will result in an overlap condition with respect to each set of received pulses.

Figure 6:
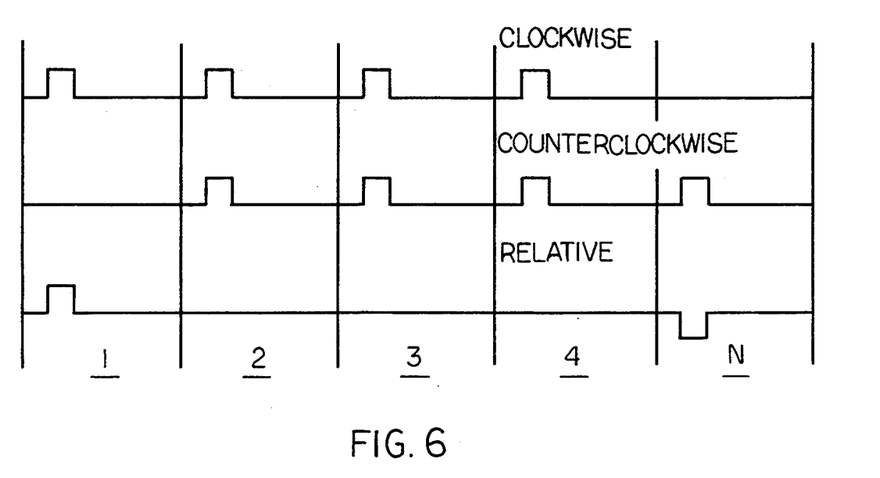
FIG. 6 is a timing diagram illustrating the utilization of the present invention in the Sagnac fiber optic system of FIG. 1, operating in the repetitive pulse train mode at a frequency of repetition equal to the characteristic frequency; and, FIG. 7 is a schematic of a generalized Sagnac fiber optic system as shown in FIG. 1, with a multicolor switchable light source.

If the repetition frequency for the pulsing of phase modulator 31 is equal to the characteristic frequency, the second of each pair of pulses received at detector 17 will be cancelled by the first of the next pair of pulses. Under these conditions, the only pulses which will not be cancelled will be the very first pulse of the first pair and the last pulse of the last pair, as received at detector 17. This is illustrated in FIG. 6. FIG. 6 illustrates a series of time frames from 1 to N, where N represents the Nth or last time frame. The first line in FIG. 6 illustrates the periodic appearance at detector 17 of the clockwise pulse produced by phase modulator 31. The second line in FIG. 6 illustrates the periodic appearance at detector 17 of the counterclockwise pulse produced by phase modulator 31. The third line in FIG. 6 illustrates the combined relative appearance of both of the pulses at detector 17. The third line is representative of what would appear on the screen of oscilloscope 19. Since the second pulse of the last pair of pulses and the first pulse of the next pair of pulses combine to cancel each other out, the screen of oscilloscope 19 will show the presence of no pulses when the frequency of phase modulator 31 is set to the characteristic frequency of the particular Sagnac fiber optic configuration.

Measurement of the frequency of repetition of the firing of phase modulator 17 is much more easily determined and can be determined to a greater degree of accuracy than measurement of exacting time increments by themselves. Both in the case of a direct time measurement as well as a frequency measurement, the time necessary for propagation of the pulses through the other fiber optic elements shown in FIG. 1 should be taken to account. This includes elements such as the polarizer 21, intensity maintenance elements 25 and 27, and the first and second beam splitters 15 and 23.

For example, consider a Sagnac fiber optic configuration similar to FIG. 1 having an $L_2$ of approximately 1 kilometer and an $L_1$ of approximately 550 meters. Using the relationship for the characteristic frequency $F_c = c/(L_1)n$ with $c = 3 \times 10^8$ m/s, $L_1 = 550$ m, and n (refractive index of the fiber) = 1.45, the estimated characteristic frequency would be 376 kilohertz. This corresponds to a time delay of $t_d = (L_1)n/c$ which equals 2.66 microseconds. The actual characteristic obtained was 367.14 kilohertz. The oscilloscope 19 used was accurate to about 10 hertz. Using the above equations, with a frequency in kilohertz accurate to a hundredth of a kilohertz, and more accurate values of the speed of light and index of refraction would yield a resolution of $L_1$ and $L_2$ accurate to about 1 centimeter. Further accuracy can be expected by performing the nulling out process using synchronous demodulation techniques.

Since the frequency is a direct measurement of the length of the optical fiber 29 of FIG. 1, this technique may be used to monitor environmental effects known to change the length of optical fiber 29, such as pressure, temperature, and strain.

Figure 7:
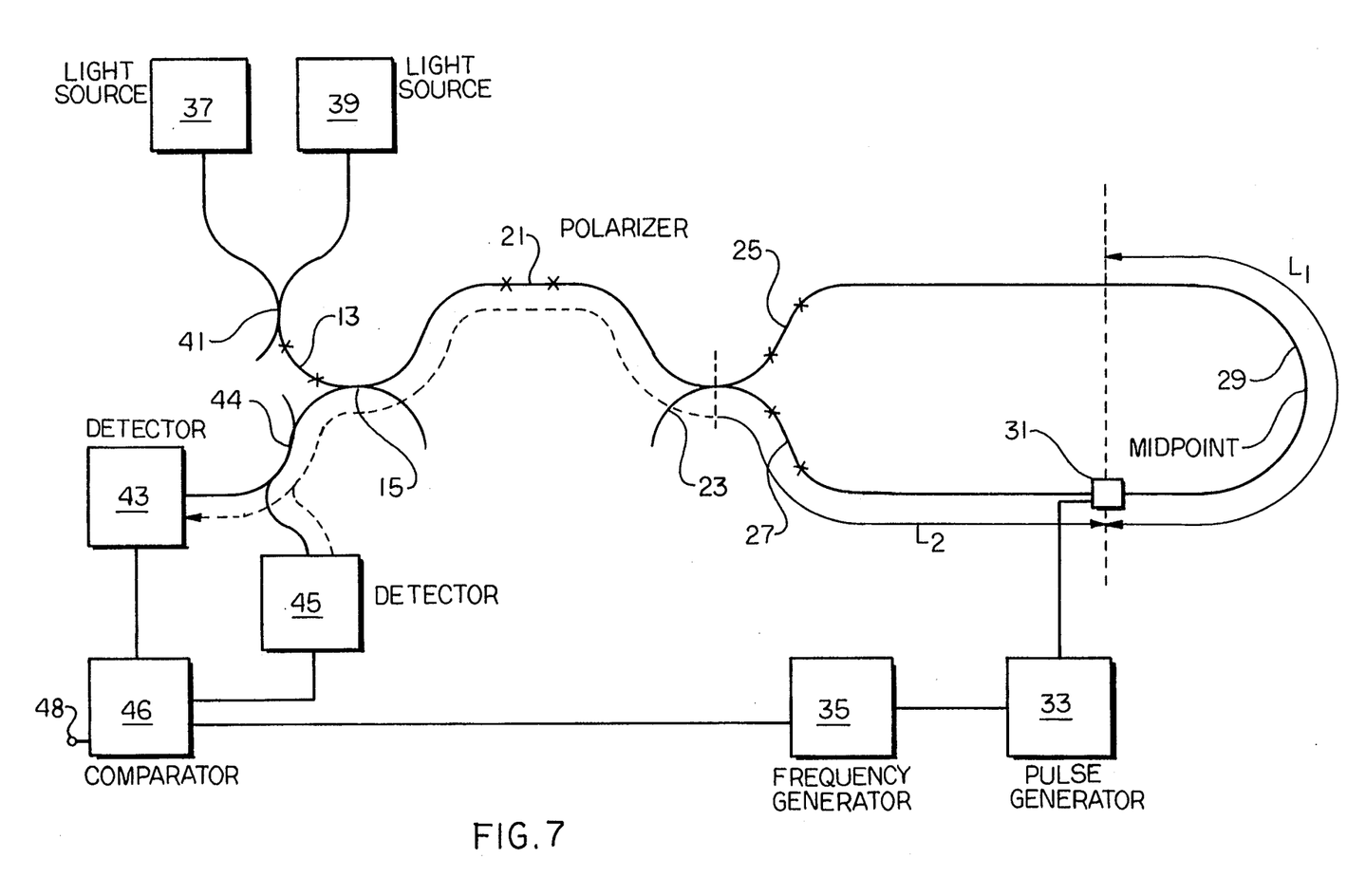

It is also possible to measure other parameters of the optical fiber 29 such as fiber dispersion by utilizing the techniques herein and employing more than one light source. This arrangement is illustrated in FIG. 7. FIG. 7. is a schematic of a generalized Sagnac fiber optic system similar to that shown in FIG. 1, with a multi-color switchable light source. In FIG. 7 a light source 37 outputs light of a first wavelength and a light source 39 outputs light of a second wavelength. Output from light sources 37 and 39 are combined in a light coupler 41 before passing through first intensity maintenance element 13 and first beam splitter 15. After reaching intensity maintenance element 13, the light passes through the system in a manner similar to that shown in FIG. 1. However, detector 17 is replaced by a pair of detectors, 43 and 45 and fiber beamsplitter 44. Detector 43 detects light from light source 37, which is of one frequency, while detector 45 detects light from light source 39, which is of another frequency. In FIG. 7, detectors 43 and 45 employ dispersive elements to aid in discerning the differences between light which emanated from light sources 37 and 39.

The characteristic frequency of phase modulator 31 pulses necessary to null out the signal is a function of the dispersive properties of the fiber. In general, the characteristic frequencies necessary to null out the signal at detectors 43 and 45 will differ because they correspond to the differing wavelengths of light sources 37 and 39. These frequencies are compared and differenced by a comparator 46, which uses the frequency generator 35 to null out the signal on detectors 43 and 45 sequentially. The resulting difference frequency 48 is the output of the system that measures dispersion.

An alternative analagous approach would be to sweep single light source through a known wavelength region and track the frequency difference to determine the dispersive properties of the optical fiber. Alternatively, if the fiber dispersion characteristics are accurately known, the wavelength of the light source could be measured.

Figure 8:
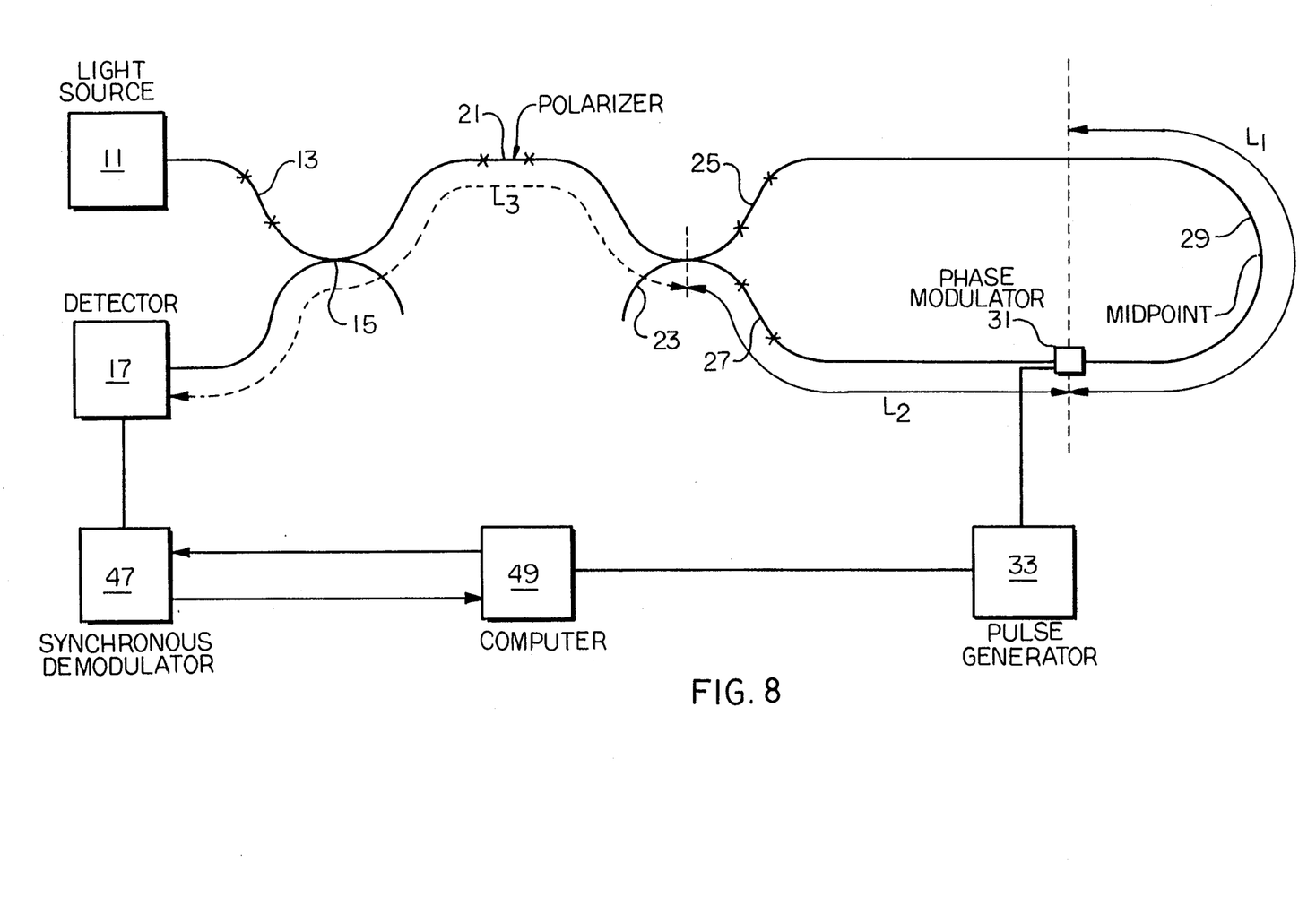
FIG. 8 is a schematic of a generalized Sagnac fiber optic system as shown in FIG. 1, illustrating automatic computer operation.

It is also possible to automatically measure the length of the optical fiber 29 by employing an iterative computer control scheme utilizing the techniques herein. This arrangement is illustrated in FIG. 8. FIG. 8 is a schematic of a generalized Sagnac fiber optic system similar to that shown in FIG. 1, but the oscilloscope with which the fundamental frequency is visually determined is replaced.

Detector 17 is, instead, connected to a synchronous demodulator 47. Synchronous demodulator 47 is both controllably and informationally connected to a computer 49. Computer 49 is also connected to pulse generator 33. Computer 49 controls the timing of the activation of pulse generator 33. Computer 49 controllably triggers the synchronization frequency of synchronous demodulator 47. Computer 49 also receives information from synchronous demodulator 47 concerning the nulling out of the pulses originating from pulse generator 33. Typically computer 49 may be programmable to iteratively generate a series of prespecified frequencies in its search for the fundamental frequency of the fiber optic system. Using the estimation technique described above, an operator or an automatic software algorithm could enter the estimate into computer 49, and the computer 49 then could automatically compute a frequency limit on either side of the computed frequency. Computer 49 could then proceed to generate a steadily increasing frequency beginning at the lower limit and continuing towards an upper limit until either the fundamental frequency is ascertained, or the upper limit is reached, or until the upper frequency capability of the computer is reached.

The foregoing disclosure and description of the invention are illustrative and explanatory thereof, and various changes in the optical circuitry and devices used therein, as well as in the details of the illustrated construction may be made without departing from the spirit and scope of the invention.

We claim:

1. A system for accurate measurement of the length of an optical fiber, comprising:
   light source means for producing a constant source of light;
   first beam splitting means, in optical communication with said light source means, for facilitating the transmission and reception of light to and from said light source means;
   an optical fiber loop;
   second beam splitting means, in optical communication with said first beam splitting means and said optical fiber loop for splitting the light from said light source means into a clockwise propagating light beam and a counterclockwise propagating light beam, and thereafter recombining said clockwise and said counterclockwise light beams;
   phase modulation means, in optical communication with and spaced at least slightly away from the midpoint of said optical fiber loop, for impressing a phase modulated pulse on both of said clockwise propagating light beam and said counterclockwise propagating light beam; and,
   detection means, in optical communication with said first beam splitting means, including electrical circuit means, for measuring the length of the optical fiber loop upon detection of said phase modulated pulse of the recombined said clockwise propagating light beam and said phase modulated pulse of said counterclockwise propagating light beam.

2. The system for accurate measurement of the length of an optical fiber as recited in claim 1 wherein said first and said second beam splitting means further comprises fiber optic beams splitters.

3. The system for accurate measurement of the length of an optical fiber as recited in claim 1 wherein said phase modulation means further comprises an integrated optical phase modulator.

4. The system for accurate measurement of the length of an optical fiber as recited in claim 1 wherein said detector means, including electrical circuit means further comprises:
   a photoelectric detector, in optical communication with said first beam splitting means, having an output; and,
   an oscilloscope, connected to said output of said photoelectric detector, to give a visual representation of the time of arrival of said phase modulated pulse at said photoelectric detector to determine said length of said optical fiber.

5. The system for accurate measurement of the length of an optical fiber, as recited in claim 1 wherein said electrical circuit means further comprises:
   a photoelectric detector, in optical communication with said first beam splitting means, having an output; and,
   means, in communication with said photoelectric detector, for indicating the presence and absence of said phase modulated pulses at said photoelectric detector.

6. An optical fiber length measuring system comprising:
   light source means for producing light;
   means for polarizing and maintaining optical intensity of said produced light from said light source means, in optical communication with said light source means;

a beam splitter, in optical communication with said means for polarizing and maintaining optical intensity, said beam splitter to split said light from said light source means into a first beam of light through a first output and a second beam of light through a second output, and to recombine said first and said second beam of light into a third beam of light;

an elongate optical fiber having one end in optical communication with said first output of said beam splitter to receive said first beam of light and transmit said second beam of light and an other end in optical communication with said second output of said beam splitter to receive said Second beam of light and transmit said first beam of light;

a phase modulator, located along and spaced at least slightly away from the midpoint of said elongate optical fiber, capable of producing a series of phase modulated pulses having an adjustable prespecifiable time interval between said pulses; and, detection means, in optical communication with said third beam, for detecting the arrival, in said third beam of light, of said phase modulated pulses.

7. The optical fiber length measuring system, as recited in claim 6, further comprising electrical circuit means, for indicating the presence and absence of said phase modulating pulses at said detection means.

8. The optical fiber length measuring system, as recited in claim 7, further comprising means, in communication with said electrical circuit means, for driving said phase modulator at a frequency which changes with time until the cancellation of successive pulses causes the absence of said phase pulses.

9. An optical fiber length measuring system comprising:
light source means for producing light;
a first optical intensity maintenance element, optically communicating with said light source;
a first beam splitter, optically communicating with said first optical intensity maintenance element, for transmitting light away from and back through said first beam splitter;
a polarizer, optically communicating with said first beam splitter;
a second beam splitter, optically communicating with said polarizer, having a first output and a second output, for transmitting light away from and back through said second beam splitter;
a second optical intensity maintenance element, optically communicating with said first output of said second beam splitter;
a third optical intensity maintenance element, optically communicating with said second output of said second beam splitter;
an elongate optical fiber having one end optically communicating with said second optical intensity maintenance element and an other end optically communicating with said third optical intensity maintenance element;
a phase modulator, located along and spaced at least slightly away from the midpoint of said elongate optical fiber, capable of producing a series of pulses having a variably selectable prespecified time interval between said pulses; and,
an optical detector, optically communicating with said first beam splitter, said optical detector optically capable of receiving and detecting the receipt of light from said first beam splitter which travels away from said elongate optical fiber.

10. The optical fiber length measuring system of claim 9 further comprising an oscilloscope, electrically connected to said optical detector, said oscilloscope to illustrate the detection of said light at said optical detector.

11. The optical fiber length measuring system of claim 9 further comprising:
a pulse generator, electrically connected to said phase modulator, said pulse generator capable of supplying pulses to said phase modulator; and,
a frequency generator, electrically connected to said pulse generator, said frequency generator capable of generating preselected frequencies for transmission to said pulse generator.

12. The optical fiber length measuring system of claim 9 wherein said light source means is capable of emitting light having at least two different wavelengths, and wherein said optical detector is capable of detecting each wavelength of light emitted from said light source means.

13. A system for measuring the degree of dispersion in a fiber optic system, comprising:
light source means for producing at least two frequencies of light;
light combiner means, in optical communication with said light source means, for combining the light of different frequencies produced by said light source means;
a first optical intensity maintenance element, in optical communication with said light combiner means;
a first beam splitter, in optical communication with said first optical intensity maintenance element, for transmitting light away from and back through said first beam splitter;
a polarizer, in optical communication with said first beam splitter;
a second beam splitter, for transmitting light away from and back through said second beam splitter, having an input in optical communication with said polarizer, a first output for a first split beam of light, a second output for a second split beam of light, said input also used to recombine said first and said second split beams of light into a recombined beam of light;
a second optical intensity maintenance element, in optical communication with said first output of said second beam splitter;
a third optical intensity maintenance element, in optical communication with said second output of said second beam splitter;
an elongate optical fiber having one end in optical communication with said second optical intensity maintenance element and an other end in optical communication with said third optical intensity maintenance element;
a phase modulator, located along and spaced at least slightly away from the midpoint of said elongate optical fiber; and,
an optical detector, in optical communication with said first beam splitter, said optical detector optically capable of receiving and detecting each frequency of light within said recombined beam of light.

14. A fiber optic light path length measuring system comprising:

light source means for producing light;

a first optical intensity maintenance element, in optical communication with said light source;

a first beam splitter, in optical communication with said first optical intensity maintenance element, for transmitting light away from and back through said first beam splitter;

a polarizer, in optical communication with said first beam splitter;

a second beam splitter, in optical communication with said polarizer, having a first output and a second output, for transmitting light away from and back through said second beam splitter;

a second optical intensity maintenance element, in optical communication with said first output of said second beam splitter;

a third optical intensity maintenance element, in optical communication with said second output of said second beam splitter;

an elongate optical fiber having one end in optical communication with said second optical intensity maintenance element and an other end in optical communication with said third optical intensity maintenance element;

a phase modulator, located along and spaced at least slightly away from the midpoint of said elongate optical fiber; and, an optical detector, in optical communication with said first beam splitter, said optical detector optically capable of receiving and detecting the receipt of light from said first beam splitter which travels away from said elongate optical fiber;

a synchronous demodulator, connected to said optical detector; and, computing means, connected to said synchronous demodulator and to said phase modulator, for controlling the frequency of said phase modulator synchronous with said synchronous demodulator.

15. The process of measuring the length of an optical system comprising the steps of:

generating light from a source thereof;

splitting said light into clockwise and counterclockwise propagating beams;

impressing a phase modulated pulse at least slightly away from the midpoint of the path of and upon said clockwise and said counterclockwise propagating beams;

recombining said phase modulated clockwise and counterclockwise propagating beams to form a recombined beam; and, detecting said recombined beams and said modulated pulses impressed thereon to determine the overall optical length of the system.

16. The process of measuring the length of an optical system, as recited in claim 15 further comprising the steps of:

maintaining the intensity of said light from said light source a first time after generation thereof;

polarizing said light after maintaining said intensity of said light from said light source a first time after generation thereof; and, maintaining the intensity of said clockwise and counterclockwise propagating beams after splitting said light into clockwise and counterclockwise propagating beams.

17. The process of measuring the length of an optical system as recited in claim 15 wherein said impressing a phase modulated pulse on said clockwise and said counterclockwise propagating beams step is repetitively performed.

18. The process of measuring the length of an optical system as recited in claim 17 wherein the repetitive performance of said impressing a phase modulated pulse on said clockwise and said counterclockwise propagating beams step is performed at differing rates until reaching the rate equaling the characteristic frequency of the optical system.

19. The process of measuring the length of an optical system as recited in claim 17 further comprising the steps of:

displaying upon an oscilloscope a representation of said detected recombined beams; and, adjusting the repetition rate of performing said impressing a phase modulated pulse on said clockwise and said counterclockwise propagating beams step until successive pulses cancel each other out to discover the rate of performance equalling the characteristic frequency of the optical system.

20. The process of measuring the length of an optical system, as recited in claim 15 further comprising the steps of:

computing a frequency of modulation for simultaneous use in said impressing a phase step and said detecting step; and, iteratively changing said frequency of modulation until the frequency of modulation equals the fundamental frequency of the optical system.

21. A system for generating a light frequency dispersion curve for an optic fiber comprising:

a variable frequency light source means for generating light over a series of known wavelengths;

first beam splitting means, in optical communication with said variable frequency light source means, for facilitating the transmission of light away from and back toward said light source means;

second beam splitting means, in optical communication with said first beam splitting means for splitting the light from said light source means into a clockwise propagating light beam and a counterclockwise propagating light beam, and thereafter recombining and transmitting said clockwise and said counterclockwise light beams toward said first beam splitting means;

optical fiber, in optical communication with said second beam splitting means, said optical fiber to facilitate the propagation of said clockwise propagating light beam and said counterclockwise propagating light beams;

phase modulation means, in optical communication with and spaced at least slightly away from the midpoint of said optical fiber, for impressing a phase modulated pulse on both of said clockwise propagating light beam and said counterclockwise propagating light beam; and, detection means, in optical communication with said first beam splitting means, including electrical circuit means, for receiving said recombined and transmitted said clockwise and said counterclockwise light beams and measuring the optical pathlength of said optical fiber and thereby generate dispersion data.

22. The process of measuring the dispersion characteristics of an optical fiber comprising the steps of:

generating light of at least two frequencies from a source thereof;

splitting said light into clockwise and counterclockwise propagating beams;

impressing a phase modulated pulse at least slightly away from the midpoint of the path of and upon said clockwise and said counterclockwise propagating beams;

recombining said phase modulated clockwise and counterclockwise propagating beams to form a recombined beam; and, detecting said recombined beams and said modulated pulses impressed thereon to determine the degree of dispersion for the optical fiber illuminated by said light of at least two frequencies.

23. The process of measuring the dispersion characteristics of an optical fiber, as recited in claim 22, and further comprising the steps of:

repeating the generating light of at least two frequencies from a source thereof step over a series of frequencies and the detecting said recombined beams and said modulated pulses impressed thereon step to determine the degree of dispersion for the optical fiber step for each of said series of frequencies of light; and, generating a dispersion curve from the data obtained from said repeating step.

24. The process of determining the wavelength of light in a fiber optic system, including the steps of claim 18, and further comprising the step of applying said characteristic frequency to a dispersion curve of said fiber optic system to find the wavelength of light corresponding to said characteristic frequency.

* * * * *